Nov. 28, 1944.  J. E. DUGGAN  2,363,841
PAINT MASK STRUCTURE
Filed March 30, 1942  2 Sheets-Sheet 1
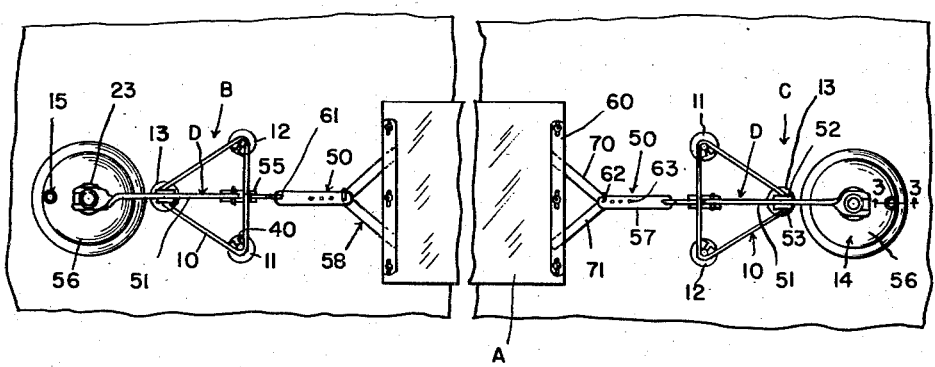
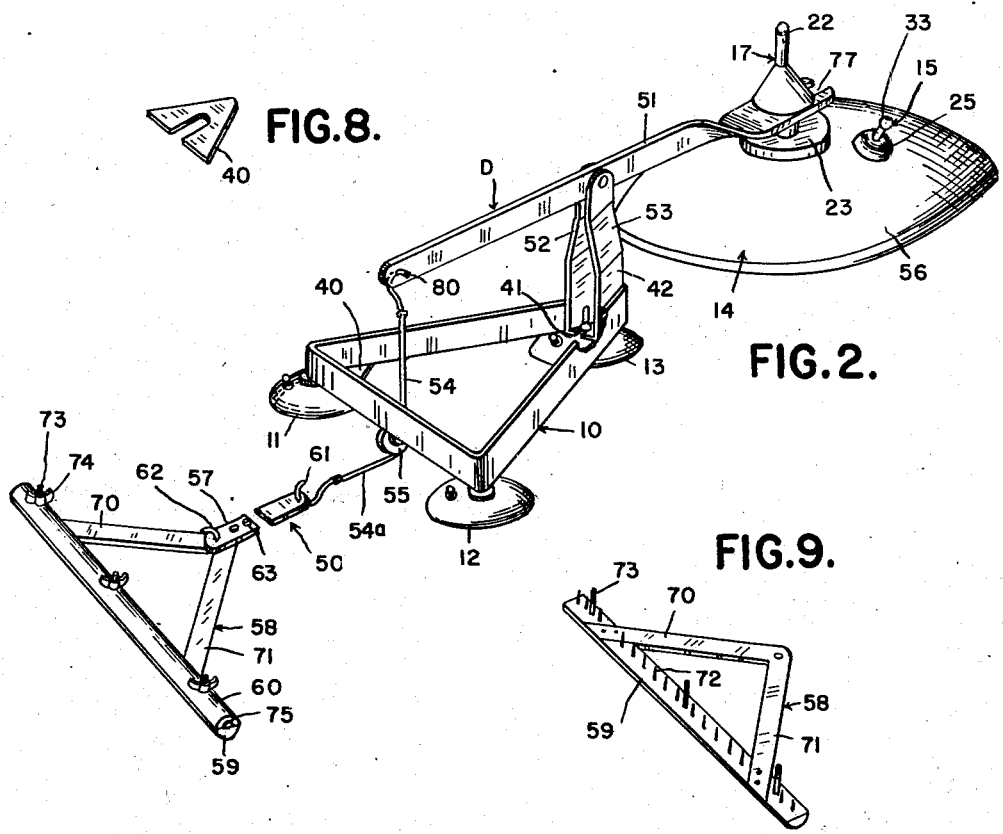
*INVENTOR.*
JAMES EDWARD DUGGAN
BY
*ATTORNEYS*

Nov. 28, 1944.   J. E. DUGGAN   2,363,841
PAINT MASK STRUCTURE
Filed March 30, 1942   2 Sheets-Sheet 2
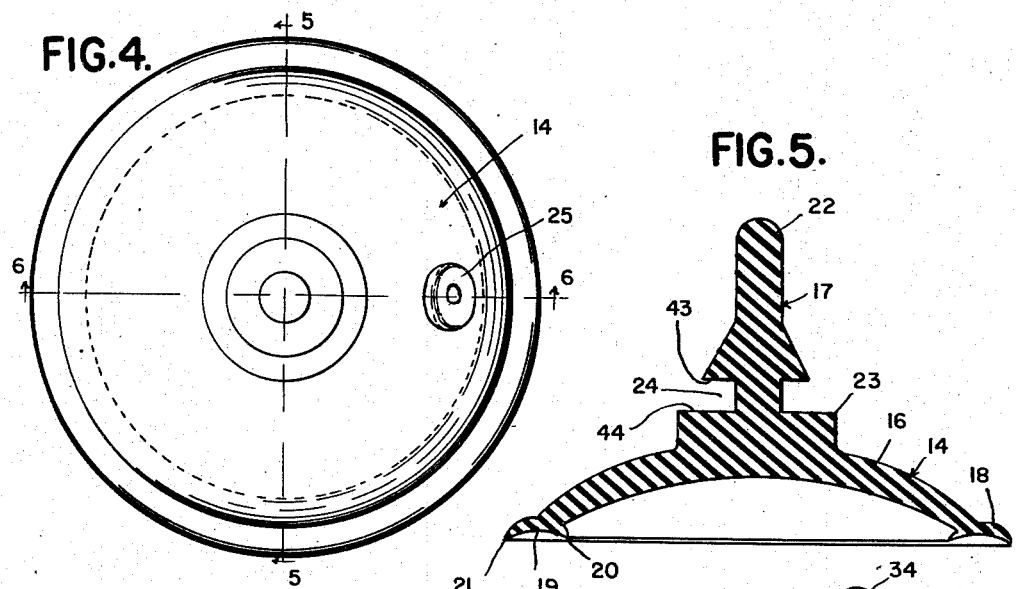
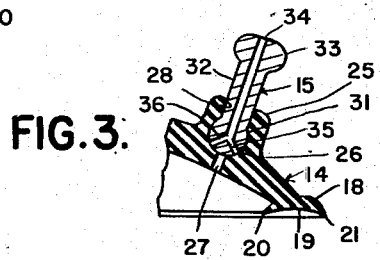
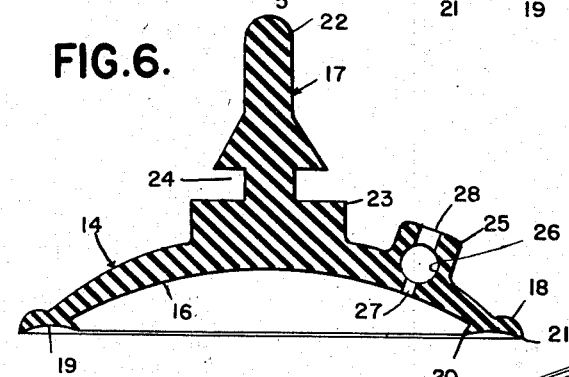
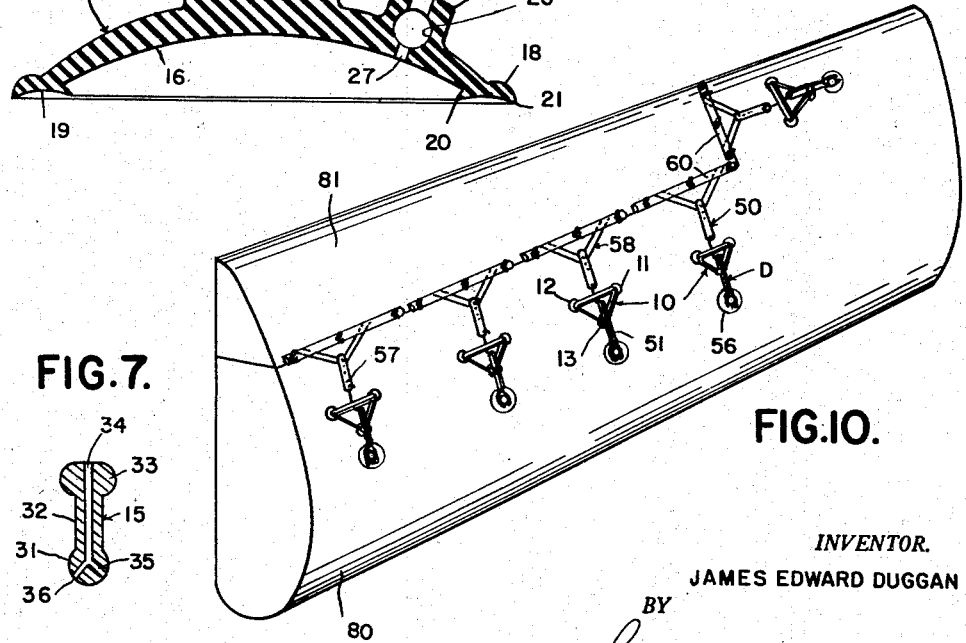
INVENTOR.
JAMES EDWARD DUGGAN
BY
ATTORNEYS Patented Nov. 28, 1944

2,363,841

UNITED STATES PATENT OFFICE 2,363,841

PAINT MASK STRUCTURE

James Edward Duggan, Detroit, Mich.

Application March 30, 1942, Serial No. 436,914

15 Claims. (Cl. 91—65)

This invention relates generally to paint mask structures and refers more particularly to those applicable to airplane wings, fuselages, and the like to cover or otherwise conceal one or more surfaces, edges or portions thereof when such articles or parts thereof are being painted so that such surface, edge, etc. will be protected from the paint being applied to an adjacent surface or portion.

Heretofore masks of this type have been formed of sheet material such as paper, and have been held in place by adhesive tape and the like. This not only involved considerable time and labor but frequently resulted in damage to the articles when the mask, especially the adhesive tape, was removed. For example, the adhesive tape oftentimes marred the finish of the surface engaged or left objectionable marks thereon which had to be removed. After being removed such masks and adhesive tape were unserviceable for further use and ordinarily had to be scrapped. Moreover, in the airplane industry it required considerable adhesive tape when masks were applied to wing surfaces and difficulty was experienced when workmen attempted to stretch relatively long masks over such surfaces or edges, particularly the latter, at the time the masks were being applied and being held in place by adhesive tape or the like.

In the present instance, the objections to the masks mentioned have been overcome by the provision of an improved mask structure that may be easily and quickly applied to the surface to be engaged, that will effectively mask the surface to be protected, and that may be easily and quickly removed without marring the surface with which it is engaged. Moreover, the improved mask structure will stand repeated handling and use and is serviceable whenever needed. No adhesive tape or material of any kind is needed and the application of the improved structure may be accomplished in less time with fewer men.

Other objects, advantages and novel details of construction of this invention will be made more apparent as this description proceeds, especially when considered in connection with the accompanying drawings, wherein:

Figure 1 is a fragmentary top plan view of an airplane wing with mask structure embodying my invention applied thereto;

Figure 2 is a perspective view of one of the applicators of the apparatus, and showing a portion of the apron or masking element held by the harness of said one of said applicators;

Figure 3 is a sectional view taken on the line 3—3 of Figure 1;

Figure 4 is a top plan view of one of the suction cups with the valve element removed;

Figure 5 is a vertical sectional view taken on the line 5—5 of Figure 4;

Figure 6 is a vertical sectional view taken on the line 6—6 of Figure 4;

Figure 7 is a vertical sectional view through the valve element;

Figure 8 is a perspective view of one of the brackets employed for attaching the triangular frame of the applicator to one of the suction cups;

Figure 9 is a perspective view of the lower apron gripper or holder of the harness;

Figure 10 is a perspective view of an airplane wing and showing the arrangement thereon of apparatus embodying my invention when used to stretch and hold linen in place prior to being secured to the wing frame structure.

Referring now to the drawings, A is the apron or masking element, and B and C respectively are the applicators for said element of an apparatus embodying my invention.

As shown, the apron A is in the form of a light, flexible sheet and is preferably made of resilient material such as rubber or rubber composition. Preferably the sheet A is long and narrow like a runner but may be any shape or size desired.

The applicators B and C are at opposite ends of and connected to the apron A and serve as anchorage means therefor upon the surface to be engaged. Preferably each applicator has a frame 10 provided with three relatively small suction cups 11, 12 and 13 respectively and stretching means D for the apron A.

In the present instance, the frame 10 is substantially triangular shape and is mounted upon the suction cups 11 to 13 inclusive so that one of the latter is at each corner of the frame. Preferably each suction cup has a resilient body 14 of rubber or rubber composition and a metal valve 15. The body 14 has a substantially concavo-convex portion 16 and a centrally located stem 17. The edge portion 18 of the body is relatively wide and has a concave suction face 19 for engagement with the surface to be engaged. Preferably the inner edge or rim 20 of this suction face 19 is shallower than the outer edge or rim 21 so that a double seal between the body 14 and surface to be engaged may be effectively obtained. The stem 17 has a cylindrical end portion 22 that serves as a finger piece and is provided between said end portion and the body 14 with an enlarged portion 23 having an annular laterally opening slot 24 therein.

Located in an enlargement 25 of the body 14 between the stem 17 and edge portion 18 thereof is a circular hole 26, while at substantially diametrically opposite sides of this hole are aligned cylindrical openings 27 and 28 respectively. The opening 27 is relatively small and extends inwardly through the concave inner face 30 of the body 14 while the opening 28 is larger and extends outwardly through the outer face of the enlargement 25. Located within the circular hole 26 and outwardly extending opening 28 in the body 14 are spherical and stem portions 31 and 32 respectively of the elongated metal valve element 15 for controlling the flow of air to and from the inner concave face 30 of the body 14. Preferably the valve element 15 has a knob or finger piece 33 at its outer end and is provided with a longitudinally extending passage 34 and branch passages 35 and 36 respectively. As shown the longitudinal passage 34 extends inwardly from the outer end of the knob 33 to a point substantially at the center of the spherical portion 31 of the valve element, while the branch passages 35 and 36 are disposed at approximately a 90° angle to each other and extend inwardly from the inner end of the passage 34 through the spherical portion 31 of the valve element so as to be normally closed by the walls of the hole 26 upon opposite sides of the inwardly extending passage 27 in the body 14.

In the present instance the lateral slots 24 in the stems 17 of two of the suction cups 11 and 12, respectively, receive the edges of slotted substantially triangular shaped brackets 40 rigid with the frame 10 at the two rear corners thereof, while the lateral slot 24 in the stem 17 of the third suction cup 13 receives the edges of the slotted base 41 of a substantially U-shaped bracket 42 rigid with the frame 10 at the forward corner thereof. Preferably the depth of the slots 24 in the stem 17 of said suction cups is less than the thickness of the brackets 40 and base 41, respectively, so that it is necessary to stretch the rubber of the enlargements in opposite directions upon the stem 17 and bodies 14 to separate the walls 43 and 44, respectively, of the slots sufficiently to permit the insertion therebetween of the edges of the slotted brackets 40 and base 41. Such walls 43 and 44 will grip the brackets 40 and base 41 when the parts are released and will effectively maintain the proper connection between the suction cups 11 to 13, inclusive, and the frame 10.

The stretching means D for the apron A preferably comprises a harness 50 for the apron A, a lever 51 between and pivoted intermediate its ends to the arms 52 and 53, respectively, of the U-shaped bracket 42, a cable 54 reeved about a pulley 55 carried by the frame 10 and terminally connected to the harness 50 and lever 51, and a relatively large suction cup 56 similar in construction to the cups 11 to 13, inclusive, and connected to the lever 51.

Preferably the harness 50 consists of a draw bar 57, a V-shaped holder 58, and cooperating jaws 59 and 60, respectively. The draw bar 57 is connected at one end by a hook 61 to the cable 54 and is connected at its other end by a split ring 62 to the apex of the V-shaped holder 58. If desired, the draw bar 57 may be provided with a series of spaced holes 63 for receiving the ring 62 to provide an adjustable connection between the holder 58 and bar 57. The jaw 59 extends across and is rigid with the arms 70 and 71, respectively, of the V-shaped holder 58 at the outer end thereof and preferably provided upon its gripping surface with a series of teeth 72 for engagement with the apron A. The cooperating jaw 60 is similar in shape and size to the jaw 59 and is adjustably connected thereto by suitable bolts 73 and wing nuts 74. Preferably this cooperating jaw 60 has a longitudinally extending groove or recess 75 in its gripping surface opposed to the teeth 72 and adapted to receive a portion of the apron A when the jaws are clamped thereon.

One end of the lever 51 is also connected by hook 80 to the cable 54, while the other end of said lever is twisted and slotted for engagement with the stem 17 of the large suction cup 56. As shown, the slotted portion 77 of the lever 51 is received in and held by the walls of the lateral slot 24 in said stem 17.

In use the apron A is stretched over the surface of the wing E or other article to be protected from paint to be applied to adjacent surfaces thereof. This is accomplished by pressing in the usual manner the three suction cups 11 to 13, inclusive, attached to the frame 10 of each applicator against said surface at the proper places to cause the apron A held by the jaws 59 and 60 of the harness 50 of each applicator to cover the surface to be protected. The large suction cup 56 of each applicator is then pressed in the usual manner against the surface of the wing to rock the lever 51 and cause the harness 50 of each applicator to exert a pull upon and stretch the apron A upon the surface to be protected and to assist the three suction cups 11 to 13, inclusive, attached to the frame 10, to hold and maintain the apron A in proper protecting position upon the surface mentioned. In this connection it will be noted that the pulley 55 is located on the underside of the frame 10 so that the horizontal portion 54ᵃ of the cable is close and parallel to the surface upon which the apparatus is mounted and thus exerts an endwise pull on the apron A tending to maintain and hold the latter in surface to surface engagement with the surface of the wing to be protected.

Should it be desired to vary the adjustment of the harness 50 relative to the frame 10 of either applicator the split ring 62 constituting the coupling between the V-shaped holder 58 and draw bar 57 may be removed from the end hole 63 and inserted into any of the other holes 63. Preferably this is done after the frames 10 of the applicators have been anchored by the small suction cups 11 to 13, inclusive, upon the wing and before the large suction cup 56 is pressed in place against said surface. When the desired adjustment has been made then the large suction cup 56 may be pressed against the wing as aforesaid.

Normally the spherical portions 31 of the valve elements 15 fit snugly against the walls of the circular holes 26 in the bodies 14 of the respective suction cups and therefore close the inner openings 27 in said bodies. Hence when the suction cups are pressed in the usual manner against the wing, the proper vacuum is obtained and the cups will hold the parts in place. The surfaces of the wing adjacent the apron A may then be painted in the usual manner without marring the surface of the wing covered by the apron.

When it is desired to remove the mask structure from the wing the valve elements 15 in the bodies 14 of the suction cups are pulled outward so that the rubber forming the walls of the circular holes 26 in said bodies will be distorted sufficiently to provide in said holes 26 spaces for air between and in communication with the branch passages 35 and 36 in the spherical portions 31 of the valve elements and the small openings 27 in the bodies 14. Thus, air from the atmosphere may enter the bodies 14 of the suction cups to destroy the vacuum between said bodies and the wing surface and permit the resiliency of the rubber forming the concavo-convex portions of the bodies to free the cups from the wing. Usually the large cups 56 would be released first, then the small cups 11 to 13 inclusive would be released. The apron A may be released from the jaws 59 and 60 of the harness either before or after the small cups mentioned have been released.

Thus, from the foregoing it will be apparent that I have provided a mask structure held by vacuum upon the surface to be protected and that may be easily and quickly applied and removed without marring the engaged surface as heretofore.

In Figure 10 I have illustrated the arrangement on an airplane wing 80 of apparatus embodying my invention for stretching and holding in place a linen sheet 81 to be stitched or otherwise secured to the framework of the wing. As shown, the linen 81 is held at two edges by my apparatus and may be held at the other edges thereof by any suitable means (not shown). Ordinarily the other edges mentioned of the linen may then be initially attached to members of a supporting frame for the wing and then engaged by my apparatus as shown. Such linen may then be stitched or otherwise secured to the framework of the wing.

What I claim as my invention is:

1. A paint mask structure attachable to an article to be painted, comprising an apron for covering a portion of said article to protect it against paint applied to the article, suction means attachable to said article beyond opposite edges of said apron, a frame carried by each suction means, a pivoted lever carried by each frame, a harness connected to each lever and having jaws gripping said apron, and additional suction means connected to each lever and attachable to said article in spaced relation to the suction means aforesaid.

2. A paint mask structure attachable to an article to be painted, comprising an apron for covering a portion of said article to protect it against paint applied to the article, harness at opposite edges of said apron and having jaws gripping said apron, frames beyond said harness and having suction means attachable to said article, and means connecting said harness to said frames.

3. A paint mask structure attachable to an article to be painted, comprising an apron for covering a portion of said article to protect it against paint applied to the article, harness at opposite edges of said apron and having jaws gripping said apron, frames beyond said harness and having suction means attachable to said article, a pivoted lever carried by each frame, additional suction means attachable to said article in spaced relation to the suction means aforesaid, means connecting said levers to the last mentioned suction means, and means connecting said levers to said harness.

4. A paint mask structure attachable to an article to be painted, comprising an apron for covering a portion of said article to protect it against paint applied to the article, frames beyond opposite edges of said apron and having suction means attachable to said article, pivoted levers carried by said frames, suction means carried by said levers and attachable to said article, draw bars between said apron and frames, pulleys carried by said frames, cables reeved around said pulleys and terminally connected to said levers and draw bars, and gripping means for said apron adjustably connected to said draw bars.

5. A paint mask structure attachable to an article to be painted, comprising an apron of resilient material for covering a portion of said article to protect it against paint applied to the article, frames beyond opposite edges of said apron and having suction means attachable to said article, harness gripping said apron and projecting toward said frames, and means carried by said frames for actuating said harness to stretch said apron over the portion aforesaid to be protected.

6. A paint mask structure attachable to an article to be painted, comprising an apron of resilient material for covering a portion of said article to protect it against paint applied to the article, frames beyond opposite edges of said apron and having suction means attachable to said article, harness gripping said apron and projecting toward said frames, and means for actuating said harness to stretch said apron over the portion aforesaid to be protected, including levers carried by said frames and operatively connected to said harness, and suction means carried by said levers and attachable to said article.

7. A paint mask structure attachable to an article to be painted, comprising an apron of resilient material for covering a portion of said article to protect it against paint applied to the article, frames beyond opposite edges of said apron and having suction means attachable to said article, harness gripping said apron and projecting toward said frames, and means for actuating said harness to stretch said apron over the portion aforesaid to be protected, including levers pivoted intermediate their ends upon said frames, suction means carried by said levers at one end thereof and attachable to said article, and means connected to said levers at the other end thereof and operable when the last mentioned suction means is attached to the article to exert a pull upon said harness.

8. A paint mask structure attachable to an article to be painted, comprising an apron for covering a portion of said article to protect it against paint applied to said article, frames beyond opposite edges of said apron, brackets carried by said frames, suction cups of resilient material having suction faces attachable to said article and having stems attached to said brackets, harness gripping said apron and extending toward said frames, and means carried by one of the brackets on said frames and connected to said harness for stretching said apron over the portions of the article to be protected.

9. A paint mask structure attachable to an article to be painted, comprising an apron for covering one portion of said article to protect it against paint applied to another portion of said article, frames attachable to said article beyond opposite edges of said apron, pulleys carried by the underside of said frames, and means for stretching the apron and holding it taut over the portion aforesaid of the article to be protected, including harness connected to the apron at opposite edges thereof, levers carried by the upperside of said frames, cables reeved on the underside of the pulleys and terminally connected to the harness and levers, and suction means carried by the levers and attachable to the article.

10. A paint mask structure attachable to an article to be painted, comprising an apron for covering one portion of said article to protect it against paint applied to another portion of said article, frames attachable to said article beyond opposite edges of said apron, pulleys carried by said frames, and means for stretching the apron and holding it taut over the portion aforesaid of the article to be protected, including adjustable harness connected to the apron at opposite edges thereof, levers carried by said frames, cables reeved on the underside of the pulleys and terminally connected to the harness and levers, and anchorage means for the levers attachable to the article.

11. A paint mask structure attachable to an article to be painted, comprising an apron for covering a portion of said article to protect it against paint applied to said article, suction means attachable to said article beyond opposite edges of said apron, and means carried by said suction means and movable relative thereto for stretching said apron over the portion aforesaid to be protected, said stretching means including means for gripping said apron and additional suction means engageable with the article and operatively connected to the gripping means to hold the apron in stretched position.

12. A paint mask structure attachable to an article to be painted, comprising an apron for covering a portion of said article to protect it against paint applied to the article, suction means attachable to said article beyond opposite edges of said apron, and means for stretching said apron over the portion aforesaid to be protected, said stretching means including means for gripping said apron, a lever connected to the gripping means and pivoted upon said suction means, and additional suction means connected to the lever and engageable with the article.

13. A paint mask structure attachable to an article to be painted, comprising an apron for covering a portion of said article to protect it against paint applied to the article, suction means attachable to said article beyond opposite edges of said apron, and means for stretching said apron over the portion aforesaid to be protected, including a lever pivoted upon the suction means, means connected to the lever for gripping the apron, and additional suction means connected to said lever and engageable with the article.

14. A paint mask structure attachable to an article to be painted, comprising an apron for covering one portion of said article to protect it against paint applied to another portion of said article, suction means attachable to said article, and means carried by and movable relative to said suction means for stretching the apron and holding the same taut over the portion aforesaid of the article to be protected, including gripping means for the apron, additional suction means engageable with the article, and means actuable by the additional suction means for exerting traction upon the gripping means and apron held thereby.

15. A paint mask structure comprising an apron for protecting one portion of an article from paint applied to another portion thereof, frames attachable to said article beyond opposite edges of said apron, and means carried by and movable relative to said frames for stretching said apron over the portion to be protected, including levers pivoted upon said frames, gripping means for the apron connected to said levers, and means connected to said levers and engageable with the article to hold the levers and gripping means in an operative position for stretching the apron.

JAMES EDWARD DUGGAN.